United States Patent [19]

Hyggen

[11] 4,122,881

[45] Oct. 31, 1978

[54] GRIPPING SHOES FOR VEHICLE WHEELS

[75] Inventor: Egil Hyggen, Oslo, Norway

[73] Assignee: Elkem-Spigerverket A/S, Oslo, Norway

[21] Appl. No.: 782,827

[22] Filed: Mar. 30, 1977

[30] Foreign Application Priority Data

Apr. 7, 1976 [NO] Norway .................................. 761184

[51] Int. Cl.² ............................................ B60C 27/04
[52] U.S. Cl. .................................... 152/216; 152/228; 152/225 R
[58] Field of Search .................... 152/213 R, 216, 218, 152/221, 225 R–230

[56] References Cited

U.S. PATENT DOCUMENTS

| | | | |
|---|---|---|---|
| 2,066,368 | 1/1937 | Snyder | 152/225 R |
| 2,746,508 | 5/1956 | Doughty | 152/228 |
| 2,985,215 | 5/1961 | Mohrman | 152/225 R |
| 3,289,727 | 12/1966 | Marks | 152/225 R |
| 3,891,018 | 6/1975 | Hyggen | 152/217 |

Primary Examiner—Albert J. Makay
Assistant Examiner—Lawrence E. Williams
Attorney, Agent, or Firm—Eyre, Mann, Lucas & Just

[57] ABSTRACT

An improved gripping member for gripping shoes used on vehicle wheels is disclosed. The cross sectional shape of the gripping member is formed as a U throughout its length whereby substantially improved traction and a substantially stronger gripping member are obtained. In a preferred embodiment, the side legs of the U-shaped gripping member are made wavy in the area which contacts the ground.

1 Claim, 3 Drawing Figures

GRIPPING SHOES FOR VEHICLE WHEELS

The present invention relates to a new and useful construction for a gripping member used in a gripping shoe assembly which improves the traction of vehicle wheels under adverse conditions such as snow, mud and the like.

Gripping shoes for vehicle wheels are well known in the art. In my prior U.S. Pat. No. 3,891,018 issued June 24, 1975, I disclose a highly useful construction for a gripping shoe used on a vehicle wheel. While this gripping shoe is very good, it has been found that in certain instances the gripping members are not sufficiently rigid. More particularly, the gripping members tend to deform in some instances as the gripping shoe is tightened against the wheel surface by means of the centrally located hub. This is because of the inherent weakness of a J-shaped gripping member.

While the foregoing disadvantage can to a degree be alleviated by making the J-shaped member of a thicker construction, it has been found that this is disadvantageous since it increases the overall weight of the gripping shoe thereby making it more difficult to handle. In addition, the cost of such a heavier shoe is necessarily higher.

I have now found that if the J-shaped gripping members are made of a U-shape with the legs of the U-shape protruding outwardly, a substantially strengthened gripping member is obtained without a substantial increase in either cost or weight. In fact, because of this unique construction, the gripping member can be made of a thinner material thereby saving both weight and money. In addition, the particular construction with the legs of the U-shaped member protruding outwardly also substantially improve the traction obtainable with the gripping shoe since the gripping members have a greater effective thickness with respect to the circumference of the vehicle wheel.

I have also found that if the legs of the U-shaped member are made wavy, there is obtained a substantial increase in sideways traction whereby sideways sliding of the vehicle to which the gripping shoe is attached is substantially reduced.

These and other features of the present invention may be more fully understood with respect to the drawings in which.

Figure 1:
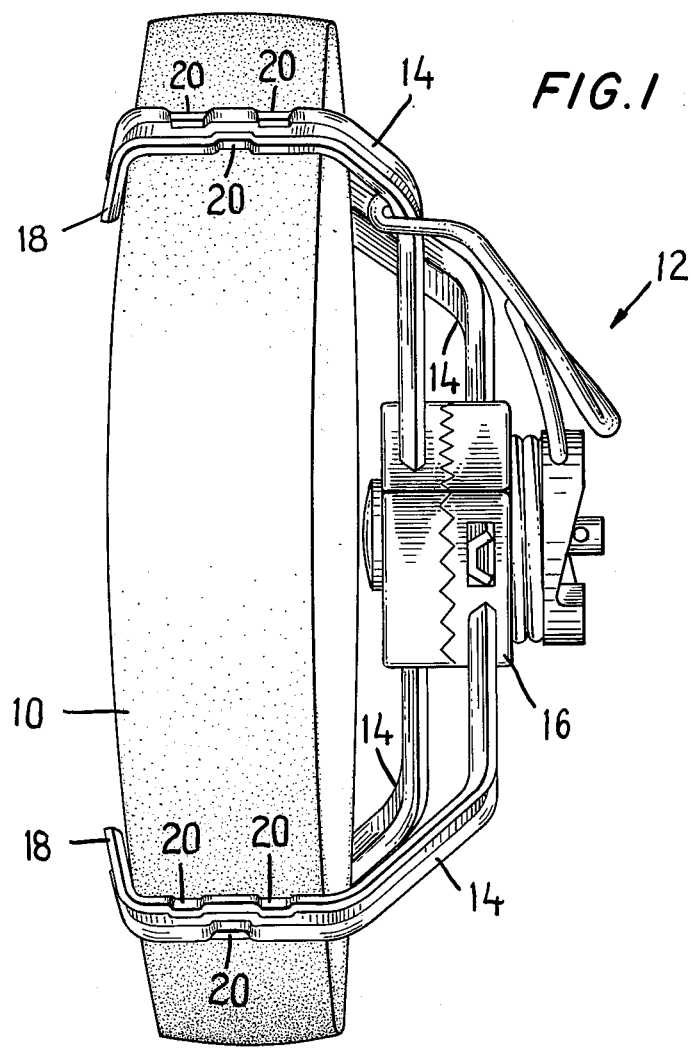
FIG. 1 shows the improved gripping shoe of the present invention affixed to a vehicle wheel.

Referring now to FIG. 1, there is shown a vehicle wheel 10 having a gripping shoe 12 thereon. The gripping shoe comprises a series of gripping members 14 which are tightened about the wheel by means of a central hub 16, preferably in the manner described in my U.S. Pat. No. 3,891,018. As shown, the gripping members 14 are formed of a U-shape with the legs 18 projecting outwardly from the gripping members, i.e., away from the wheel. As explained hereinbefore, the U-shape construction gives much improved strength to the gripping member while at the same time reducing its weight and increasing its traction capabilities.

Figure 2:
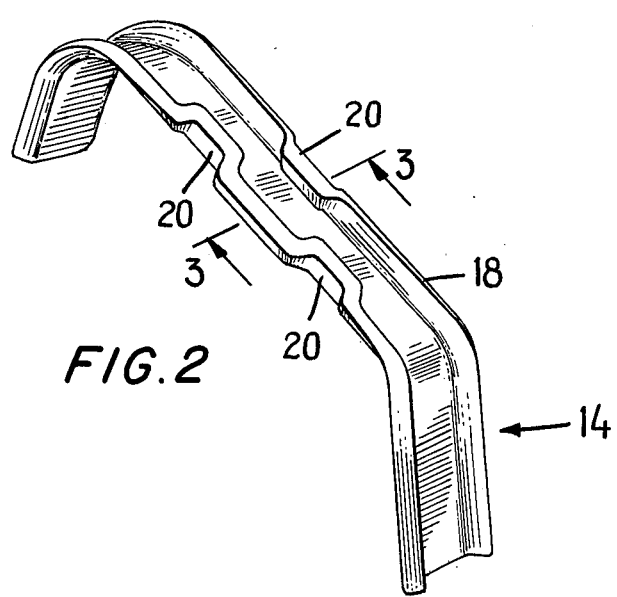
FIG. 2 shows the preferred embodiment of a gripping member in accordance with the present invention.
Figure 3:
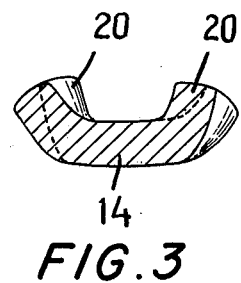
FIG. 3 is a cross section through line 3—3 of FIG. 2.

Referring to FIGS. 2 and 3, there is shown the preferred embodiment of the gripping member of the present invention wherein the legs 18 of the gripping member 14 are made wavy or corrugated as shown at 20 in the area of the gripping member which engages the ground, i.e., the area of the circumferential surface of the tire. The waves or corrugations 20 are preferably in offset relation as shown in FIG. 2. As can be seen, the axis of the corrugation is perpendicular to the circumferential surface of the tire 10.

It will be understood that the claims are intended to cover all changes and modifications of the preferred embodiment of the invention, herein chosen for the purpose of illustration, which do not constitute departure from the spirit and scope of the invention.

What is claimed is:

1. In a gripping shoe for vehicle wheels comprising a plurality of J-shaped gripping members and a central housing having means for drawing said plurality of J-shaped gripping members snugly about a vehicle tire, the improvement comprising said J-shaped gripping members having a uniform U-shape cross section throughout their length with the legs of said U-shape cross section protruding outwardly, the legs of said U-shape cross section at least in the area of said gripping member which engages the ground being wavy and the waves on one leg of the U-shape cross section being offset from the waves on the other leg of the U-shape cross section being offset from the waves on the other leg of the U-shape cross section whereby sideways sliding is resisted.

* * * * *

UNITED STATES PATENT AND TRADEMARK OFFICE
CERTIFICATE OF CORRECTION

PATENT NO. : 4,122,881
DATED : Oct. 31, 1978
INVENTOR(S) : Hyggen, Egil

It is certified that error appears in the above-identified patent and that said Letters Patent are hereby corrected as shown below:

Column 2, lines 46 & 47, "being offset from the waves on the other leg of the U-Shape-Cross section "should be deleted.

Signed and Sealed this

Twenty-ninth Day of May 1979

[SEAL]

Attest:

RUTH C. MASON
Attesting Officer

DONALD W. BANNER
Commissioner of Patents and Trademarks